United States Patent
Puhov et al.

(10) Patent No.: US 8,566,637 B1
(45) Date of Patent: Oct. 22, 2013

(54) ANALYZING DRIVE ERRORS IN DATA STORAGE SYSTEMS

(75) Inventors: Peter Puhov, Shrewsbury, MA (US); Shay Harel, Marlborough, MA (US); Huzefa Hakimi, Shrewsbury, MA (US); Lili Chen, Hopkinton, MA (US); Zhiqi Liu, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 411 days.

(21) Appl. No.: 12/977,962

(22) Filed: Dec. 23, 2010

(51) Int. Cl.
*G06F 11/00* (2006.01)

(52) U.S. Cl.
USPC ............................ 714/6.32; 714/42; 714/47.2

(58) Field of Classification Search
None
See application file for complete search history.

(56) References Cited

U.S. PATENT DOCUMENTS

| | | | | |
|---|---|---|---|---|
| 6,883,126 | B1 * | 4/2005 | Herman et al. | 714/723 |
| 7,225,368 | B2 * | 5/2007 | Lancaster | 714/48 |
| 8,112,818 | B2 * | 2/2012 | Wold | 726/32 |
| 8,195,983 | B2 * | 6/2012 | Celeskey et al. | 714/38.1 |
| 2005/0246590 | A1 * | 11/2005 | Lancaster | 714/47 |
| 2007/0250723 | A1 * | 10/2007 | Shima et al. | 713/300 |
| 2012/0124679 | A1 * | 5/2012 | Wold | 726/32 |

\* cited by examiner

*Primary Examiner* — Christopher McCarthy
(74) *Attorney, Agent, or Firm* — Krishnendu Gupta; Jason A. Reyes

(57) ABSTRACT

A method is used in analyzing drive errors in data storage systems. An error tag and total good I/O count are maintained for a drive. For each failed I/O, the following is performed. An error weight per error is retrieved. A new error tag is calculated from the error weight, a previous error tag, and the total good I/O count. An error ratio is calculated from the new error tag and a total I/O count. The error ratio is compared with thresholds. If one or more of the thresholds has been crossed, action is taken on the drive. The error tag is reduced as good I/O is produced.

20 Claims, 6 Drawing Sheets

ANALYZING DRIVE ERRORS IN DATA STORAGE SYSTEMS

BACKGROUND

1. Technical Field

This application generally relates to analyzing drive errors in data storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Disk drives are used as primary data storage devices in data storage systems and other modern computer systems and networks. While very reliable, today's disk drives occasionally fail. In addition to causing computer system downtime, such disk drive failures can result in the loss of some or all of the data stored in the disk drive. Accordingly, disk drives commonly perform Predictive Failure Analysis (PFA) using Self-Monitoring, Analysis and Reporting Technology (SMART), to predict disk drive failure caused by the gradual decay of electrical and/or mechanical components of the disk drive. The primary goal of PFA is to predict when disk drive failure is imminent to allow the data stored in the disk drive to be archived.

PFA is generally performed during the operation of the disk drive by monitoring key disk drive attributes that are indicative of the health of the disk drive. Additionally PFA can be implemented by performing periodic self-diagnostic tests on the disk drive. Present methods of performing PFA in disk drives will predict imminent disk drive failure based upon errors associated with a single attribute (e.g., read errors, seek errors, fly-height errors, etc.). In these methods, errors corresponding to the single attribute are monitored and compared to a threshold value. When the errors exceed the threshold, a warning of imminent disk drive failure is provided to the user.

SUMMARY OF THE INVENTION

A method is used in analyzing drive errors in data storage systems. An error tag and total good I/O count are maintained for a drive. For each failed I/O, the following is performed. An error weight per error is retrieved. A new error tag is calculated from the error weight, a previous error tag, and the total good I/O count. An error ratio is calculated from the new error tag and a total I/O count. The error ratio is compared with thresholds. If one or more of the thresholds has been crossed, action is taken on the drive. The error tag is reduced as good I/O is produced.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Described below is a technique for use in analyzing drive errors in data storage systems. In at least one implementation, the technique may be used to help provide a process for detecting drive abnormal conditions with frequency-based accumulative error information and taking preventive actions on a faulty drive to recover it or remove it from the system. For example, in accordance with the technique, since conventionally a single faulty drive can cause data unavailability (DU) if the system fails to remove it after the occurrence of excessive drive errors, at least one implementation using the technique tries to identify the faulty drive based on its accumulated errors and take preventive actions to try to recover it and/or remove it if necessary.

According to the implementation, as described further below:

1. an error tag (error_tag) and total good I/O count are maintained for each drive;

2. for each failed I/O, an error weight per error is retrieved, a new error tag is calculated from error weight, a previous error tag, and total good I/O count, and an error ratio (error_ratio) is calculated from the new error tag and total I/O count;

3. the error ratio is compared with thresholds, and if one or more of the thresholds have been crossed, preventive actions are taken to reset the drive, power cycle it, proactively spare it, or remove it;

4. the error tag is reduced as good I/O is produced or the system completes its recovery actions; and 5. a configuration file having definitions of error weights and thresholds is dynamically updated without system reboot.

A previous (conventional) approach did not maintain drive error history over time and did not take any action to recover/remove a drive if the drive reported excessive errors on different commands. The previous approach treated each I/O failure individually and did not save/review drive error history from the past. If a drive completed a command only by substantial retries/remaps, the previous approach did not recognize the drive as a faulty drive but the drive's time-consuming retries/remaps negatively impacted the system, causing performance issues and/or data unavailability.

By contrast, at least one implementation of the current technique may provide one or more of the following advantages. The system can identify drives that report excessive errors, and the system can take various levels of preventive and/or other actions to correct the drive behavior and/or remove the drive from the system.

Figure 1:
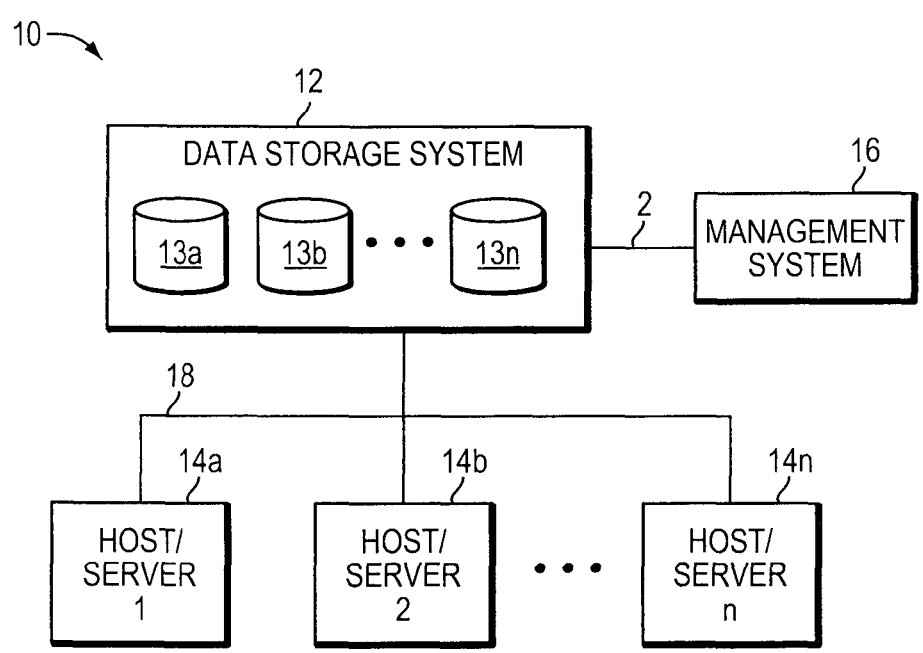
FIGS. 1-3 are examples of embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
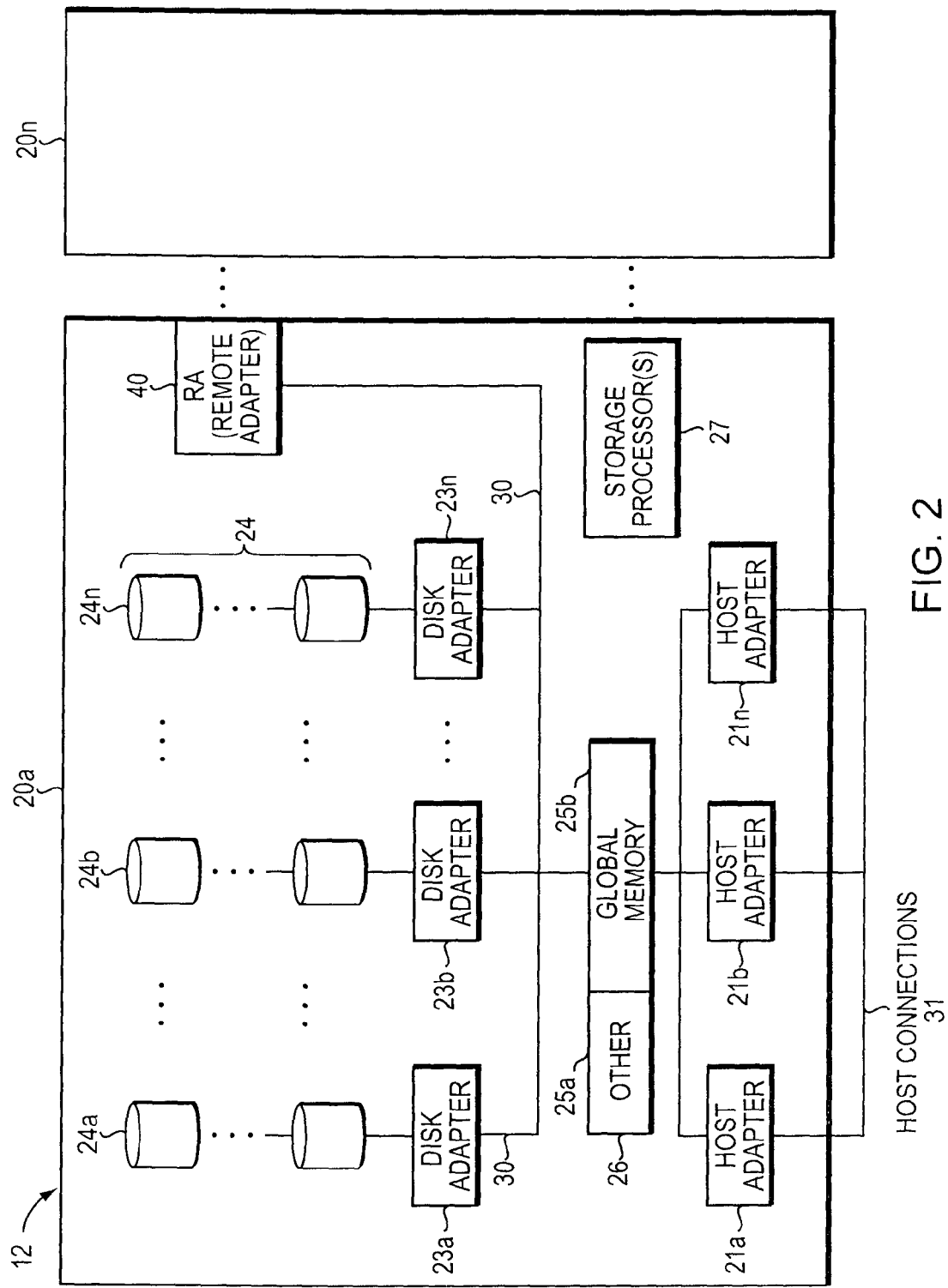

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the CLARiiON® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

I/O operations performed in a data storage system may include I/O operations of a first type which are received by the data storage system from an external client, such as a host. I/O operations performed by the data storage system may also include other I/O operations of a second type which are not initiated by the host or other external client. Rather, these other I/O operations may be initiated from within the data storage system, such as by a backend component of the data storage system. I/O operations of this second type may be referred to as background I/O operations which are not executed in a context of a host I/O, or more generally, in a context of an external client I/O operation. Background I/O operations may include I/O operations performed in connection with, for example, monitoring and maintaining the data storage system such as repairing a RAID drive (e.g., read and/or write operations in connection with correcting corrupted user data and/or RAID parity information), performing an I/O operation to check on the status and proper functioning of a physical drive, initializing a physical drive by writing out a particular initialization value or pattern to physical drive portions, and the like.

Figure 3:
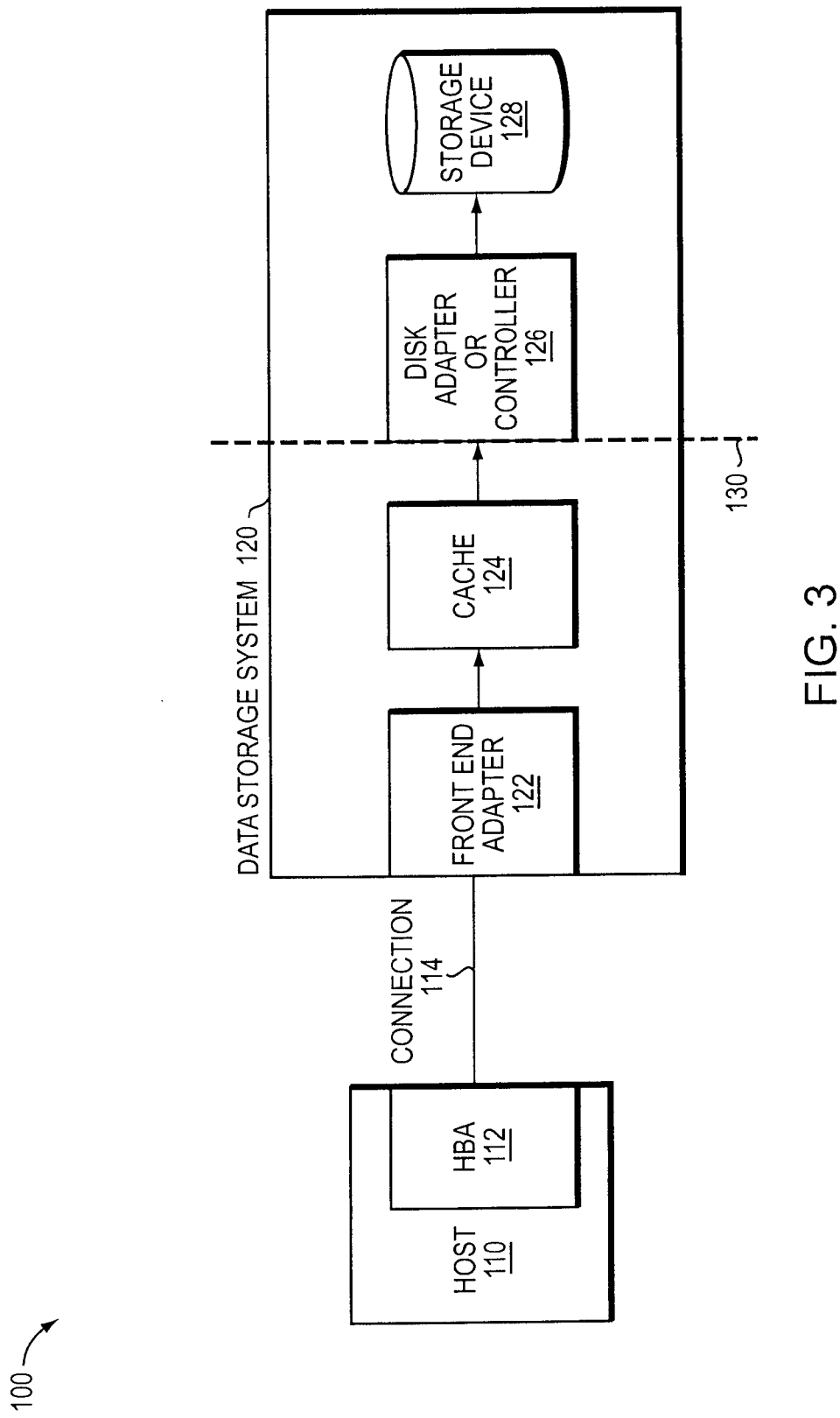

With reference to FIG. 3, shown is an example 100 illustrating components of a system that may be used in performing the different types of I/O operations in an embodiment in accordance with techniques herein. The example 100 includes a simplified view of components of a system as described above. The example 100 includes a host 110 with an HBA 112. The host 110 communicates with data storage system 120 over connection 114. Connection 114 may be, for example, a network connection between the HBA 112 and a front end adapter 122 of the data storage system 120. As described above, a front end adapter 122 may be, for example, an FA. The data storage system 120 also includes a cache 124, a DA or storage controller 126 and one or more physical storage devices 128 (e.g., disks or solid state devices (SSDs) such as a flash drive). The host 110 may issue an I/O operation to the data storage system over connection 114. For example, the host may issue a write operation to write data to a portion of storage device 128. In one embodiment, the data of the write operation may first be stored in cache 124 and then destaged at a later point in time by DA 126 to the physical storage device 128. The foregoing host write operation is an example of an I/O operation of the first type described above. The DA is an example of a backend data storage system component that may also initiate I/O operations. For example, the DA may initiate an I/O operation to periodically test or verify the health and status of the physical device 128. This latter I/O operation as initiated by the DA may be characterized as a background I/O operation described above which is not in the context of an I/O operation from the host or other client external to the data storage system. In such an embodiment, line 130 may represent an imaginary line within the system 120 partitioning the backend from the front end of the data storage system 120. In this embodiment, the background operations may be characterized as data storage system initiated operations and, more particularly, in some embodiments, such background operations may be initiated by a backend component such as a DA.

In a system such as a data storage system described above, there may be drive errors when performing the different types of I/O operations. Described in following paragraphs are processes that may be used in connection with analyzing drive errors in data storage systems.

At least one implementation of a system using the technique has one or more of the following features:
  Support for multiple drive types. The system may be applied to SCSI errors and FIS errors while still using uniform decision making logic.
  Inclusion of errors that happen during drive discovery, such as INQ and MODE_SENSE.
  I/O based error fading. The system uses the number of I/Os to the drive as its metric for fading errors, which correlates directly to I/Os that could have errors. The system architecture provides a count of I/Os per drive.
  Error handling decisions can be based on a specific drive type, vendor, revision, or serial number range. This provides the ability to adjust the behavior, e.g., in XML files, for specific drives that are known to require special handling.
  Ability to get an indication from the port whether I/O errors are caused by link issues (e.g., selection timeouts) rather than drive errors.

With respect to an overview of the system, instead of having rules (also referred to as weights) for each SCSI code permutation, the system relies on dividing all the possible errors into categories with common recovery characteristics. For example, the system treats recovered errors differently from hardware errors or media errors. A main difference between the error categories is how much the physical drive object (PDO) will be "forgiving" towards the error. Recovered errors for example, take more time to affect the health of the drive, while hardware errors cause the drive to try and recover itself, or die, much quicker. There is also a global error counter which takes into account all of the errors and it has its own threshold.

The error categories are:
  1) Recoverable errors—most of the 01XX SCSI errors.
  2) Media errors—e.g., errors that require a remap.
  3) Hardware errors—errors that indicate the drive hardware has a problem.
  4) Link errors—Indicate the link between the drive and its connection port is bad.
  5) Data errors—Indicate data is corrupted and the drive is not even aware of the issue (which is caught by RAID only).
  6) Global count—This is incremented whenever there is any error of the type above and serves as overall drive health indicator.

With respect to error recovery path, when an I/O is determined to be bad by the PDO, it goes through an error recovery path which includes three major steps:

1) Determining the error category and whether there is any unique handling. For example, some errors require deactivation of the drive immediately.
2) Asking drive handling software (referred to as Upper DH) to retry the error if it is possible to retry it.
3) Recording the error and using an error threshold process described below to determine next steps.

With respect to recovery action for all errors, a main difference between the error categories is how long it takes the system to try and recover or deactivate the drive. This is determined by a process and parameters described further below.

For all errors, the basic sequence of handling an error is as follows:
  1) Record the errors in internal data structures (currently, not persistent).
  2) Reset the drive.
  3) If a reset did not help and a reset threshold is passed, start proactive sparing and reset one more time.
  4) If the last reset did not help, deactivate the drive.

With respect to error threshold process, the following describes the process which is used to determine when to try and recover or deactivate the drive and the overall drive. In general, the process helps make certain that each error counts towards the overall health of the drive, and as more I/O completes without generating any errors of a certain category, the process fades the error category.

With respect to main components of the process, the system uses three parameters to make decisions. Each error category has different arguments which are pre-set at boot time but can be configured online, as described herein. In addition to these main parameters there are a few more possible inputs.

In at least one implementation, there are no time based calculations in this process; all calculations are based on the number of I/Os between errors. The rational for this is that if there is no activity on the drive for a while, a time based process fades the error, even though the drive is still bad, while an I/O based process is not similarly impacted.

The following are parameters (arguments) used by the process:
  1) Interval—This argument describes how many I/Os without any errors are required in order to fade this error category away.
  2) Weight—This argument describes how disruptive the error is, from the perspective of the drive's health. Recovered errors have a smaller weight while media or hardware errors have a bigger weight. The bigger the weight is, the faster the drive tries to recover or be deactivated.
  3) Threshold—This argument is the percentage value (between 0% and 100%) above which the system starts to do recovery and inform the layers above this drive is in need for proactive sparing.
  4) Error burst reduction—This is used to make sure that if the system has a burst of errors in a very short time, the process will not try to recover or deactivate the drive too soon. This feature has two parameters:
    a. Burst delta—The amount of time between errors that corresponds to a burst.
    b. Weight reduction—The amount by which to reduce the original weight of the error to prevent the system from advancing too quickly into a state of recovery or deactivating the drive.
  5) Recovery reduction—The amount by which to reduce the latest error occurrence after a reset. This makes sure the system gives the drive enough time to recover from the reset action itself so that only real errors are allowed to affect an assessment of its health.

With respect to process flow, the main flow of the process is as follows, with a more detailed explanation of the major steps described subsequently.

1. Get the error type and possible actions.
2. Get the parameters need for calculation.
3. Record the I/O count in which the error happened (this is referred to as the error tag).
4. Check whether the threshold for this error category has been exceeded.
5. Take the recommended action.

With respect to process flow and recording the location of the error, when an error happens, the system needs to record it on an I/O count axis and determine how far it is from a current I/O count. The use of the weight in the process helps make sure that if there are many I/Os with errors, over time, the location of the error on the I/O count axis gets close to the current I/O location and indicates that the system needs to try and recover.

The location of the first error is always the current I/O count less the interval. This way, the system calculates based on this interval within which the error is permitted. Any error that follows increases in weight.

Figure 4A:
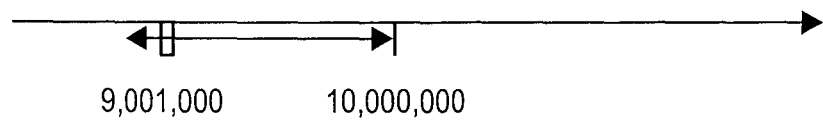
FIGS. 4A-4C, 5 are examples of graphs that may be used in an embodiment in accordance with techniques herein.
Figure 4B:
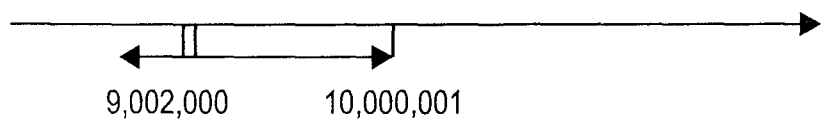
Figure 4C:
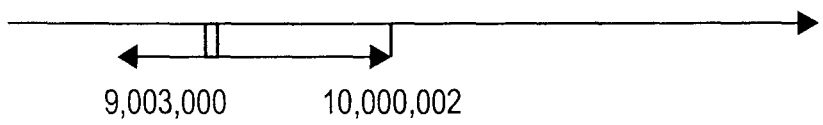

FIGS. 4A-4C show an example for an error that happened at I/O 10,000,000 wherein this error type has an interval of 1,000,000 and weight of 1000.

In a first snapshot shown in FIG. 4A, an error happened at I/O 10,000,000 and was recorded as happening in 9,000,000+1,000 for the weight (the arrow is interval).

In a second snapshot shown in FIG. 4B, another error happened at I/O 10,000,001 and was recorded as happening in 9,001,000+1,000.

In a third snapshot shown in FIG. 4C, another error happened at I/O 10,000,002 and was recorded as happening in 9,002,000+1,000.

As shown, the gap between the current I/O and the error_tag is shrinking over time and if it is normalized it to a 100% range, at a certain point a threshold is crossed that indicates the error_ratio is too big and the system needs to recover from it.

With respect to process flow and fading an error, if an error does not happen very frequently, the system needs to fade it, so that multiple occurrences over a long time period do not eventually cause the system to deactivate the drive.

In the case of fading, the behavior is slightly different. Every good I/O drives the health of the drive a little higher by incrementing the I/O counter. When the I/O counter is increasing, the next error has a smaller weight due to the way the error calculations use the I/O count.

Fading takes longer if the error tag is closer to the threshold since the system should help to make sure that it takes many I/Os to "clean" the drive's health. On the other hand, a drive that experienced a small amount of errors before starting to get good I/Os takes a shorter time to recover.

Figure 5:
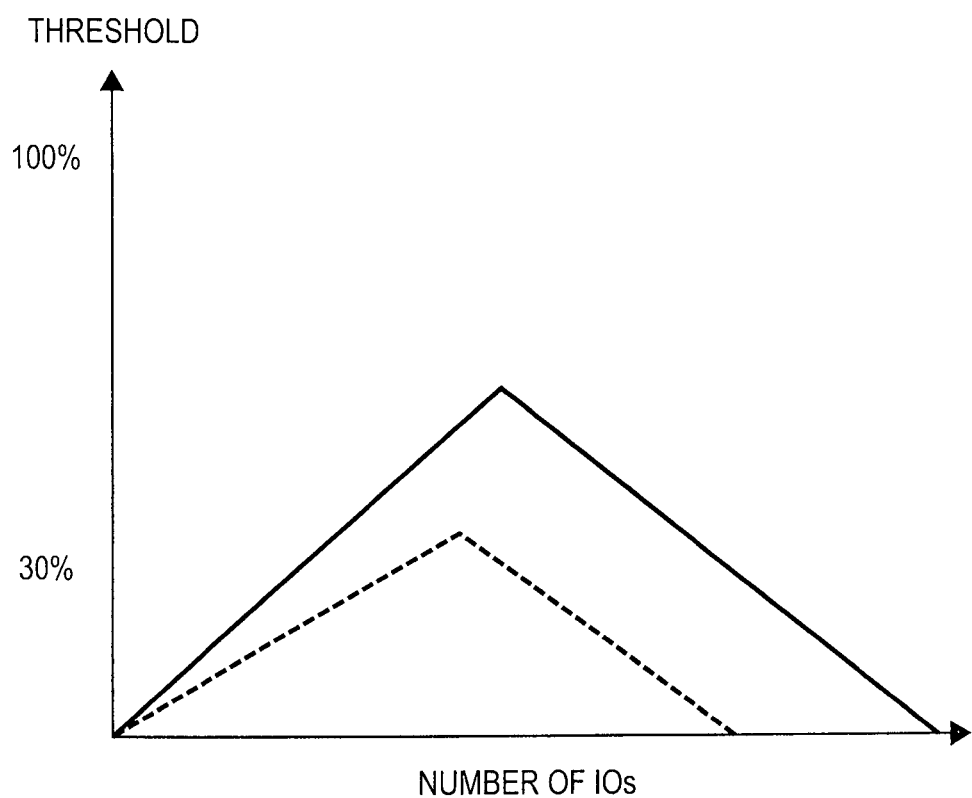

In the example shown in FIG. 5, a lower curve shows a drive that experienced errors which pushed it to be about 30% "sick" and then started to have good I/Os again. This drive needs fewer I/Os to fade. On the other hand, an upper curve shows a drive that was closer to the 90% threshold, hence it takes a longer time to fade the errors there.

In at least one implementation, in a rough approximation, it takes about 7-8 good I/Os to fade one error.

Figure 6:
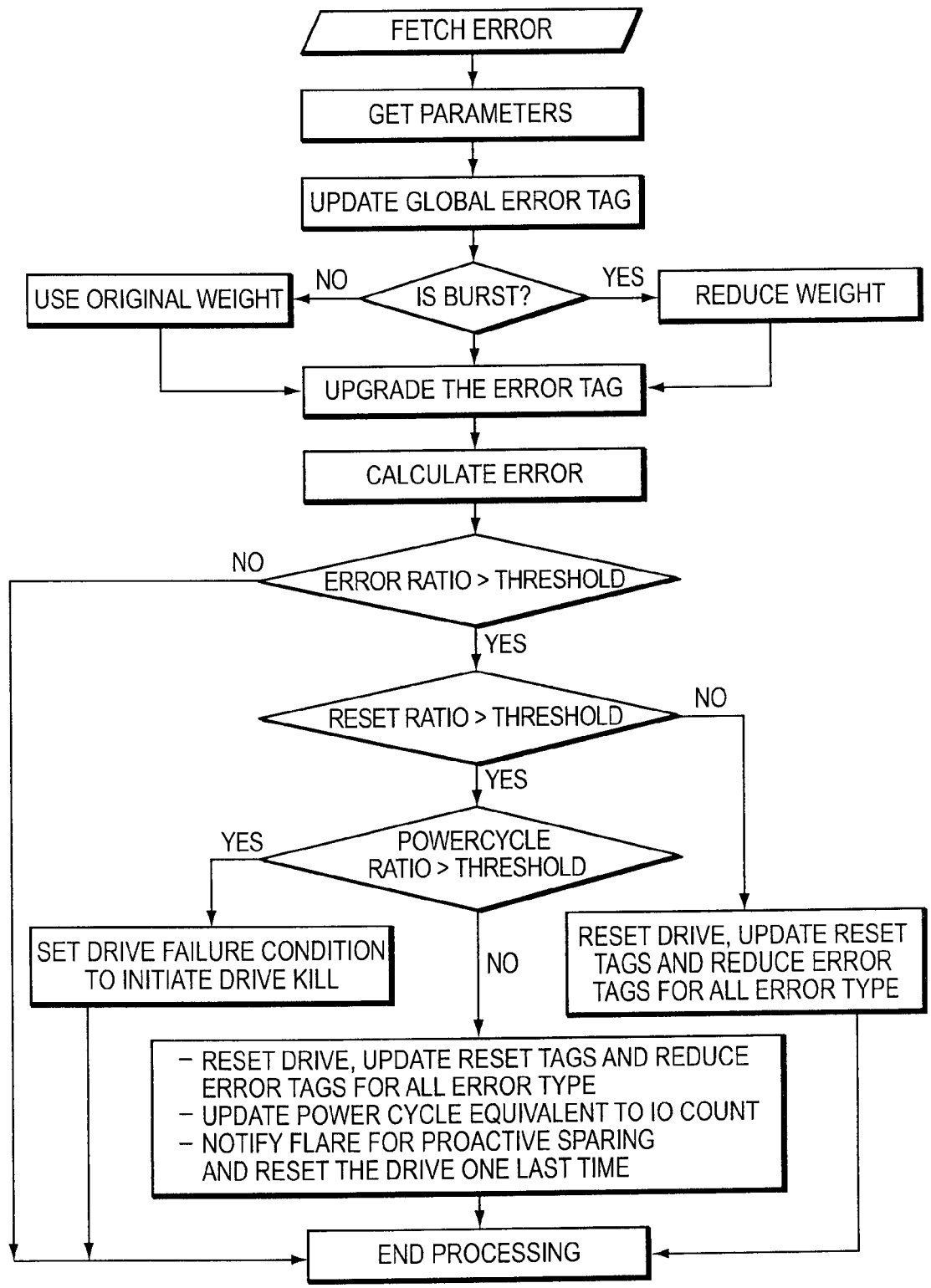
FIG. 6 is a flowchart of processing steps that may be performed in an embodiment in accordance with techniques herein.

FIG. 6 illustrates a process flow chart of the process described herein.

With respect to controlling resets, resets are controlled in much the same way as the major error categories are handled. Every time the system does a reset in the process, the system records the I/O count in which it was done and checks the ratio. If the ratio of the resets is excessive, the next action is a last reset accompanied with a proactive sparing recommendation, if the last reset did not help, the drive is deactivated.

With respect to guidelines for setting parameters, in at least one implementation, default parameters are as follows (order is: interval, weight, threshold):

1000000, 1000, 90—Cumulative
 1000000, 10000, 90—Recovered
 1000000, 50000, 90—Media
 1000000, 100000, 90—Hardware
 100, 2, 101—Link (currently disabled by 101%)
 1000000, 200000, 90—Reset
 1000000, 0, 0 Power cycle—for future use
 1000000, 50000, 90—Data
 100—Burst delta in ms.
 20—Burst weight reduce
 30—Recovery weight reduce (Recovery=power cycle, reset)

If a new error category is to be added, the following guidelines should be followed:

1) The more serious the error category is, the lower its interval should be.
2) The more serious the error category is, the higher its weight should be.
3) The ratio between the interval and the weight should get lower as the problem gets more serious. So if a new category is added and its seriousness is between the recovered errors and the media errors, the ratio it has should be in between the ratios the other categories have.
4) A category may be disabled by setting its threshold to 101 so that the drive is never deactivated and no recovery attempts are done as a result.

With respect to CDB/FIS libraries and getting the error category, CDB or FIS libraries are in charge of taking the raw packets with the CDB or FIS blocks and converting them to an error category. This way, the process does not work with SCSI error codes directly.

In at least one implementation, the mapping of the native error to an error category is hard coded and can be overridden using the same table that supplies the information about the parameters needed for calculating the threshold.

The CDB or FIS libraries also produce an action to take, based on field experience and knowledge preserved from data storage operating system software ("Flare"). For example, when encountering FBE_SCSI_ASC_DEFECT_LIST_ERROR error code, the CDB library produces two results:

1. Map the FBE_SCSI_ASC_DEFECT_LIST_ERROR to a recovered error category.
2. Recommend proactive sparing.

With respect to CDB/FIS library logic flow, when an I/O completes, it goes through the CDB or FIS library for analysis in the following order (this is example is for CDB, but FIS follows a similar sequence):

1) If there was a port error, set the error category (can be HW or LINK) and exit.
2) If the error was a SCSI error, look for a CHECK CONDITION flag.
3) If there was no CHECK CONDITION flag, the I/O is good and the process can exit.
4) If there is a CHECK CONDITION flag, check whether there is a special treatment for it in a dynamic table (explained below).

5) If there is no special treatment (also called exception), map the SCSI error to an error category using hard coded logic.

6) Give as output the error category and any suggested handling if needed (including retry).

Once the PDO gets the output of the CDB library, it checks whether one of the recommendations is to retry the I/O and if so, it marks the I/O as retryable and completes it to the Upper DH before going on and recording the error and checking for thresholds.

With respect to parameters configuration, in order to do all the calculations, the process needs to know which parameters to use for each error category. The parameters can be configured from a table, which is statically compiled as default and can be changed with an XML file pushed from Flare. Pushing a new table from Flare does not disrupt a system running I/O.

With respect to drive configuration service, the drive configuration service resides in the physical package and is in charge of holding the parameters need for calculations. As explained, the service can hold unique parameters, based on the drive type, or other drive characteristics. This allows better control when special handling of errors is needed.

The service also holds an exception list for each drive type, which can be used to override the hardcoded mapping. For example, a 01.18.00 sense code combination is interpreted as a recoverable error. However, if there is an exception entry for it, it can be re-categorized as hardware error if desired.

With respect to table structure, the table is an array of records, each containing the following information:
Drive class (SAS/SATA/FC)—Mandatory
Vendor—Optional
Part Number—Optional
REV—Optional
SN range—Optional
Threshold Information per category (Weight, Interval, Threshold).
Exception list At minimum, each record needs to have the drive class. More information about the drive can be added if there is more specific handling needed. So for example, if there is one entry in the table for SAS drives and another for SAS Brand H drives, any SAS drive which is manufactured by Brand I, would take data from the SAS only entry but any Brand H drive would take data from the SAS Brand H entry.

With respect to communicating with the drive configuration service, the PDO has a pre-set condition on the ACTIVATE rotary to register with the drive configuration service. When it registers, it gives the service all the information it has about itself, so the service can find the best match for it in the table. The match is done by Drive Class, Vendor, Part Number, Firmware rev, SN.

When the service finds the best match, a handle is returned to the drive, which represents the entry in the table. Once the PDO has the handle, it uses it to get the parameters to do calculations. This way, there is only one copy in the system and there is no need to duplicate it across all PDO objects.

When a PDO is destroyed, it de-registers with the drive configuration service. This way, if a table entry is changed, the drive configuration service can keep a reference count of drives registered with it and determine when no one is using the entry.

With respect to online update of the drive configuration service, the drive configuration service can be updated when the system runs I/O. All the entries in a configuration XML file are pushed to the table and the table decides which of them are new and which of them are just updates to an existing record. If a new record is introduced, the drive configuration service alerts all the drives of the new type in the system to check whether they need to be updated. If an existing record was changed, no update is sent to the drive. The next time the drive has an error, it uses the existing handle to get the new parameters.

With respect to use cases and examples, the following describes three basic use cases which concentrate on the process.

In a first use case, errors are accumulated and the drive is to be deactivated.

1) PDO registers with the drive configuration table and gets a handle based on the information it supplied.

2) An I/O completes and it has 01.18.01 in the sense buffer.

3) The CDB block is passed to the CDB library for analysis.

4) The CDB library looks for exception and does not find any.

5) The CDB library map the error category as a FBE_PAYLOAD_CDB_FIS_ERROR_FLAG_RECOVERED and the status as FBE_PAYLOAD_CDB_FIS_IO_STATUS_OK.

6) These arguments are passed to the statistics library for recording the error.

7) The statistics library gets the current I/O counter which is 2,000,000.

8) The statistics library gets the statistics information from the drive configuration service into fbe_drive_stat_t variable, using the handle acquired at step 1.

9) Based on the error category acquired at step 5, the statistics library knows the parameters to work with are: Interval=1,000,000, weight=10,000, threshold=90.

10) The statistics library checks what the error time was and determines whether the difference between it and the current time is equal to or less than the burst_delta from step 8 as part of the whole structure.

11) There is no error burst and no need to reduce the weight.

12) The statistics library updates the global error threshold and checks its ratio (the steps taken are identical to the one that follows for the recovered errors category).

13) The statistics library calls the fbe_stat_io_fail function described herein and passed it the recovered error stat portion of the fbe_drive_stat_t received at step 8.

14) fbe_stat_io_fail finds this is the first error and sets the error_tag of the recovered errors for this PDO as 1,010,000 (2,000,000−1,000,000+10,000).

15) The statistics library calls fbe_stat_get_ratio to calculate the ratio.

16) fbe_stat_get_ratio function calculates the ratio as:

$$p=100.0/1,000,000=0.0001$$

$$\text{diff}=io\_counter-error\_tag=990,000$$

$$r=(fbe\_u32\_t)(100-p*(\text{double})\text{diff})=1 \text{ (which is 1\%)}$$

17) Since 1% is less that the threshold of 90 (acquired at step 9), no need to try and recover. The I/O is completed since there was no special handling recommended by the CDB library.

18) Another I/O completes with 01.18.01 error. This time the I/O counter is 2,000,010

19) The system follows all steps from 2-14 and calculates error_tag as: 1,020,000 (it is increased by one weight unit).

20) Follow step 15 and 16 and achieve:

$$p=100.0/1,000,000=0.0001$$

$$\text{diff}=io\_counter-error\_tag=980,010$$

$$r=(fbe\_u32\_t)(100-p*(\text{double})\text{diff})=1 \text{ (which is 1.99\%)}$$

21) Since 1.99% is less that the threshold of 90 (acquired at step 9), no need to try and recover. The I/O is completed since there was no special handling recommended by the CDB library.

22) If there continue to be more bad I/Os every 10th I/O, eventually, the ratio reaches 90%, and then the drive is reset.

23) After the reset, the latest error tag is reduced by 30% based on the data in the table. The reset_tag is equal to the last I/O count when we received the error and did the reset. Its ratio and advancement are done the same way it is done for errors until eventually it gets to the state where it passes its own threshold after numerous resets.

24) After a few resets, the drive sends a proactive sparing message and attempts a last reset, after which it deactivates itself.

In a second use case, errors are accumulated but not quickly, so the error fades.

1) PDO registers with the drive configuration table and gets a handle based on the information it supplied.

2) An I/O completes and it has 01.18.01 in the sense buffer.

3) The CDB block is passed to the CDB library for analysis.

4) The CDB library looks for exception and does not find any.

5) The CDB library map the error category as a FBE_PAYLOAD_CDB_FIS_ERROR_FLAG_RECOVERED and the status as FBE_PAYLOAD_CDB_FIS_IO_STATUS_OK.

6) These arguments are passed to the statistics library for recording the error.

7) The statistics library gets the current I/O counter which is 2,000,000.

8) The statistics library gets the statistics information from the drive configuration service into fbe_drive_stat_t variable, using the handle acquired at step 1.

9) Based on the error category acquired at step 5, the statistics library knows the parameters to work with are: Interval=1,000,000, weight=10,000, threshold=90

10) The statistics library checks what the error time was and determines whether the difference between it and the current time is equal or less than the burst_delta received on step 8 as part of the whole structure.

11) There is no error burst and no need to reduce the weight.

12) The statistics library updates the global error threshold and checks its ratio (the steps taken are identical to the ones that follow for the recovered errors category).

13) The statistics library calls the fbe_stat_io_fail function described herein and passed it the recovered error stat portion of the fbe_drive_stat_t it received at step 8.

14) fbe_stat_io_fail finds this is the first error and sets the error_tag of the recovered errors for this PDO as 1,010,000 (2,000,000−1,000,000+10,000)

15) The statistics library calls fbe_stat_get_ratio to calculate the ratio.

16) fbe_stat_get_ratio function calculates the ratio as:

$p=100.0/1,000,000=0.0001$ diff=$io$_counter−error_tag=990,000

$r=(fbe\_u32\_t)(100-p*(double)diff)=1$ (which is 1%)

17) Since 1% is less that the threshold of 90 (acquired at step 9), no need to try and recover. The I/O is completed since there was no special handling recommended by the CDB library.

18) Another I/O completes with 01.18.01 error. This time the I/O counter is 2,020,000

19) The process follows all steps from 2-14 and calculates error_tag as: 1,039,807 (based on the fact it was below the interval, so it is necessary to make it "jump" up the scale).

20) Follow step 15 and 16 and the process achieves:

$p=100.0/1,000,000=0.0001$ diff=$io$_counter−error_tag=980192

$r=(fbe\_u32\_t)(100-p*(double)diff)=1.9807\%$

21) Since 1.9801% is less that the threshold of 90 (acquired at step 9), there is no need to try and recover. The I/O is completed since there was no special handling recommended by the CDB library.

22) Another I/O completes with 01.18.01 error. This time the I/O counter is 2,060,000

23) The process follows all steps from 2-14 and calculates error_tag as: 1,079,701

24) Follow step 15 and 16 and the process achieves:

$p=100.0/1,000,000=0.0001$ diff=$io$_counter−error_tag=980,299

$r=(fbe\_u32\_t)(100-p*(double)diff)=1.97\%$

25) Since 1.97% is less that the threshold of 90 (acquired at step 9), there is no need to try and recover. The I/O is completed since there was no special handling recommended by the CDB library.

26) Another I/O completes with 01.18.01 error. This time the I/O counter is 2,250,000

27) The process follows all steps from 2-14 and calculates error_tag as: 1,268,214

28) Follow step 15 and 16 and the process achieves:

$p=100.0/1,000,000=0.0001$ diff=$io$_counter−error_tag=981,786

$r=(fbe\_u32\_t)(100-p*(double)diff)=1.821\%$

29) Since 1.821% is less that the threshold of 90 (acquired at step 9), there is no need to try and recover. The I/O is completed since there was no special handling recommended by the CDB library.

30) Another I/O completes with 01.18.01 error. This time the I/O counter is 3,350,000

31) This time, since the I/O counter is more than 2*interval away from the error tag of 1,268,214, the error tag is reset to be (3,350,000−1,000,000+10,000)=2,360,000. This makes the percentage low again and the process starts counting up if there are more errors.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in analyzing drive errors in data storage systems, the method comprising:
maintaining an error tag and total good I/O count for a drive;
for each failed I/O:
retrieving an error weight per error;
calculating a new error tag from the error weight, a previous error tag, and the total good I/O count; and
calculating an error ratio from the new error tag and a total I/O count;
comparing the error ratio with thresholds;
if one or more of the thresholds has been crossed, taking an action on the drive; and
reducing the error tag as good I/O is produced.

2. The method of claim 1, wherein the error tag is used to help provide a process for detecting drive abnormal conditions with frequency-based accumulative error information.

3. The method of claim 1, wherein a configuration file having definitions of error weights and thresholds is dynamically updated.

4. The method of claim 1, wherein the drive errors may include SCSI errors and FIS errors.

5. The method of claim 1, wherein reducing the error tag is based on I/O based error fading.

6. The method of claim 1, wherein error handling decisions are based on at least one of the following: specific drive type, vendor, revision, and serial number range.

7. The method of claim 1, wherein errors are divided into categories with common recovery characteristics.

8. The method of claim 1, wherein the more serious an error category is, the lower the error category's interval, the higher the error category's weight is, and the lower the ratio between the interval and the weight.

9. The method of claim 1, wherein when a drive error happens, the drive error is recorded on an I/O count axis, and it is determined how far the recorded drive error is from a current I/O count.

10. The method of claim 1, wherein the drive error is recorded in internal data structures, the drive is reset, if a reset did not help and a reset threshold is passed, proactive sparing is started, the drive is reset last time, and if the last reset did not help, the drive is deactivated.

11. A system for use in analyzing drive errors in data storage systems, the system comprising:
a processor comprising a program logic for carrying out the steps of:
first logic maintaining an error tag and total good I/O count for a drive;
second logic retrieving an error weight per error for each failed I/O;
third logic calculating a new error tag from the error weight, a previous error tag, and the total good I/O count for each failed I/O; and
fourth logic calculating an error ratio from the new error tag and a total I/O count for each failed I/O;
fifth logic comparing the error ratio with thresholds;
sixth logic taking an action on the drive if one or more of the thresholds has been crossed; and
seventh logic reducing the error tag as good I/O is produced.

12. The system of claim 11, wherein the error tag is used to help provide a process for detecting drive abnormal conditions with frequency-based accumulative error information.

13. The system of claim 11, wherein a configuration file having definitions of error weights and thresholds is dynamically updated.

14. The system of claim 11, wherein the drive errors may include SCSI errors and FIS errors.

15. The system of claim 11, wherein reducing the error tag is based on I/O based error fading.

16. The system of claim 11, wherein error handling decisions are based on at least one of the following: specific drive type, vendor, revision, and serial number range.

17. The system of claim 11, wherein errors are divided into categories with common recovery characteristics.

18. The system of claim 11, wherein the more serious an error category is, the lower the error category's interval, the higher the error category's weight is, and the lower the ratio between the interval and the weight.

19. The system of claim 11, wherein when a drive error happens, the drive error is recorded on an I/O count axis, and it is determined how far the recorded drive error is from a current I/O count.

20. The system of claim 11, wherein the drive error is recorded in internal data structures, the drive is reset, if a reset did not help and a reset threshold is passed, proactive sparing is started, the drive is reset last time, and if the last reset did not help, the drive is deactivated.

* * * * *